US008144764B2

(12) United States Patent
Hannuksela

(10) Patent No.: US 8,144,764 B2
(45) Date of Patent: *Mar. 27, 2012

(54) VIDEO CODING

(75) Inventor: Miska Hannuksela, Tampere (FI)

(73) Assignee: Nokia Oy, Espoo (FI)

( * ) Notice: Subject to any disclaimer, the term of this patent is extended or adjusted under 35 U.S.C. 154(b) by 1249 days.

This patent is subject to a terminal disclaimer.

(21) Appl. No.: 11/242,888

(22) Filed: Oct. 5, 2005

(65) Prior Publication Data

US 2006/0029129 A1 Feb. 9, 2006

Related U.S. Application Data

(63) Continuation of application No. 09/855,640, filed on May 15, 2001, now Pat. No. 6,968,005.

(30) Foreign Application Priority Data

May 15, 2000 (GB) .................................. 0011597.2

(51) Int. Cl.
*H04N 7/12* (2006.01)
*H04N 11/02* (2006.01)
*H04N 11/04* (2006.01)
*H04B 1/66* (2006.01)

(52) U.S. Cl. .................................. 375/240.01

(58) Field of Classification Search ............. 375/240.01, 375/240.12–13, 240.15–16; 348/394.1, 401.1, 348/402.1, 403.1, 412.1, 415.1; 382/236, 382/238

See application file for complete search history.

(56) References Cited

U.S. PATENT DOCUMENTS

| 4,972,261 A | 11/1990 | Whalley |
| 5,768,527 A | 6/1998 | Zhu et al. |
| 6,111,915 A | 8/2000 | Fukunaga et al. |
| 6,169,821 B1 | 1/2001 | Fukunaga et al. |
| 6,357,028 B1 | 3/2002 | Zhu |
| 6,393,152 B2 | 5/2002 | Takahashi et al. |
| 6,629,261 B1 | 9/2003 | Chintada et al. |
| 6,711,140 B1 | 3/2004 | Agarwal et al. |

FOREIGN PATENT DOCUMENTS

| CN | 1199531 A | 11/1998 |
| EP | 0637027 A2 | 2/1995 |
| EP | 0702492 A1 | 3/1996 |
| EP | 0713340 A2 | 5/1996 |
| EP | 0 849 952 | 6/1998 |
| EP | 0849952 | 6/1998 |
| EP | 0 851 685 | 7/1998 |
| EP | 0851685 | 7/1998 |
| GB | 2268661 | 1/1994 |

(Continued)

OTHER PUBLICATIONS

ITU-Telecommunications Standardization Sector, Ninth Meeting: Red Bank, NJ, Oct. 19-22, 1999.

(Continued)

*Primary Examiner* — Nhon Diep
(74) *Attorney, Agent, or Firm* — Alston & Bird LLP

(57) ABSTRACT

A method of encoding a video signal representing a sequence of pictures, the method employing both non-temporal prediction and temporal prediction, wherein the method comprises, for each picture that forms a reference picture for the temporal prediction of another picture, associating with each such picture an indicator indicating the temporal order of the reference picture in the encoded video signal relative to the other reference pictures in the encoded video signal.

62 Claims, 6 Drawing Sheets

FOREIGN PATENT DOCUMENTS

| | | |
|---|---|---|
| JP | 09-027944 | 1/1997 |
| JP | 09-098382 | 4/1997 |
| JP | 09-247669 | 9/1997 |
| JP | 10-145794 | 5/1998 |

OTHER PUBLICATIONS

ITU-Telecommunications Standardization Sector, Seventh Meeting: Feb. 15-19, 1999, Monterey, CA, USA pp. 1-11.

"Error Concealment in Encoded Video Streams" by SALMA, et al. pp. 1-32.

"Professor Delp's Recent Publications" Recent Pub. of Edward J. Delp.

"Picture Layer" 5.1 Recommendation H.263 (Feb. 1998).

"Error Control and Concealment for Video Communication: A Review" pp. 974-997.

ITU-Telecommunications Standardization Sector, Ninth Meeting: Red Bank, New Jersey, Oct. 19-22, 1999 p. 1.

ITU—Telecommunications Standardization Sector, Ninth Meeting: Red bank, New Jersey , Oct. 19-22, 1999, pp. 1-3.

ITU—Telecommunications Standardization Sector, Ninth Meeting: Red Bank, New Jersey, Oct. 19-21, 1999 p. 1-2.

ITU—Telecommunications Standardization, Sector, Nov. 1999, pp. 1-43.

Extended European Search Report for European Application No. 09010864.8 dated Jun. 28, 2010.

Office Action for Japan Application No. 2001-585523 dated Dec. 5, 2011.

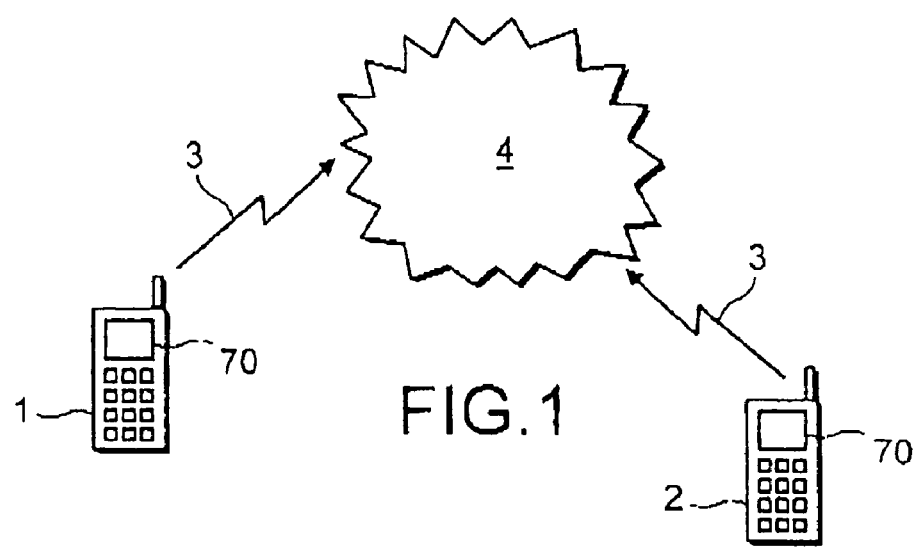
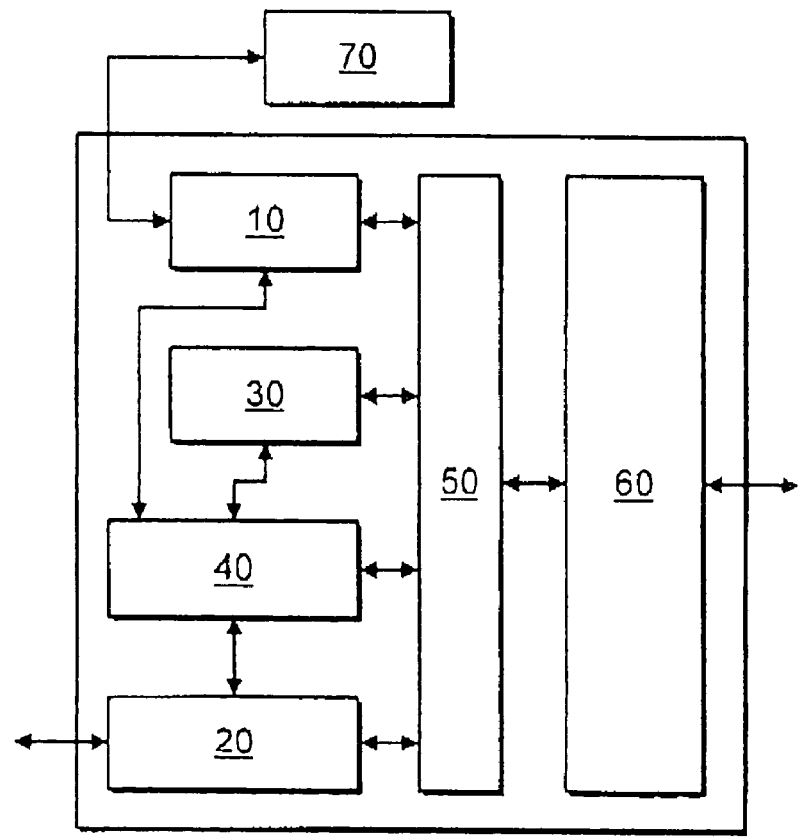

| PSC | TR | PTYPE | PQUANT | CBM | PSBI | TR$_B$ | DBQUANT | PEI | PSUPP | PEI | GOBs | ESTUF | EOS | PSTUF |

FIG.6

| PSC | TR | PTYPE | PQUANT | CBM | PSBI | RPON | PEI | PSUPP | PEI | GOBs | ESTUF | EOS | PSTUF |

| PSC | TR | PTYPE | PQUANT | CBM | PSBI | RPON | PEI | PSUPP | PEI | GOBs | ESTUF | EOS | PSTUF |

PSUPP expansion:
| FTYPE = RPON | DSIZE = 1 | PARAMETER DATA = RPON VALUE |

FIG. 9

| PSC | TR | PTYPE | PQUANT | CBM | PSBI | RPON | PEI | PSUPP | PEI | GOBs | ESTUF | EOS | PSTUF |

PSUPP expansion:
| FTYPE = Picture message | CONT | EBIT | MTYPE |

VIDEO CODING

RELATED APPLICATIONS

This application is a continuation application of application Ser. No. 09/855,640 filed May 15, 2001 now U.S. Pat. No. 6,968,005.

BACKGROUND OF THE INVENTION

This invention related to video coding.

A video sequence consists of a series of still pictures or frames. Video compression methods are based on reducing the redundant and perceptually irrelevant parts of video sequences. The redundancy in video sequences can be categorised into spectral, spatial and temporal redundancy. Spectral redundancy refers to the similarity between the different colour components of the same picture. Spatial redundancy results from the similarity between neighbouring pixels in a picture. Temporal redundancy exists because objects appearing in a previous image are also likely to appear in the current image. Compression can be achieved by taking advantage of this temporal redundancy and predicting the current picture from another picture, termed an anchor or reference picture. Further compression is achieved by generating motion compensation data that describes the motion between the current picture and the previous picture.

However, sufficient compression cannot usually be achieved by only reducing the inherent redundancy of the sequence. Thus, video encoders also try to reduce the quality of those parts of the video sequence which are subjectively less important. In addition, the redundancy of the encoded bit-stream is reduced by means of efficient lossless coding of compression parameters and coefficients. The main technique is to use variable length codes.

Video compression methods typically differentiate between pictures that utilise temporal redundancy reduction and those that do not. Compressed pictures that do not utilise temporal redundancy reduction methods are usually called INTRA or I-frames or I-pictures. Temporally predicted images are usually forwardly predicted from a picture occurring before the current picture and are called INTER or P-frames. In the INTER frame case, the predicted motion-compensated picture is rarely precise enough and therefore a spatially compressed prediction error frame is associated with each INTER frame. INTER pictures may contain INTRA-coded areas.

Many video compression schemes also use temporally bi-directionally predicted frames, which are commonly referred to as B-pictures or B-frames. B-pictures are inserted between anchor picture pairs of I- and/or P-frames and are predicted from either one or both of these anchor pictures. B-pictures normally yield increased compression as compared with forward-predicted pictures. B-pictures are not used as anchor pictures, i.e., other pictures are not predicted from them. Therefore they can be discarded (intentionally or unintentionally) without impacting the picture quality of future pictures. Whilst B-pictures may improve compression performance as compared with P-pictures, their generation requires greater computational complexity and memory usage, and they introduce additional delays. This may not be a problem for non-real time applications such as video streaming but may cause problems in real-time applications such as video-conferencing.

A compressed video clip typically consists of a sequence of pictures, which can be roughly categorised into temporally independent INTRA pictures and temporally differentially coded INTER pictures. Since the compression efficiency in INTRA pictures is normally lower than in INTER pictures, INTRA pictures are used sparingly, especially in low bit-rate applications.

A video sequence may consist of a number of scenes or shots. The picture contents may be remarkably different from one scene to another, and therefore the first picture of a scene is typically INTRA-coded. There are frequent scene changes in television and film material, whereas scene cuts are relatively rare in video conferencing. In addition, INTRA pictures are typically inserted to stop temporal propagation of transmission errors in a reconstructed video signal and to provide random access points to a video bit-stream.

Compressed video is easily corrupted by transmission errors, mainly for two reasons. Firstly, due to utilisation of temporal predictive differential coding (INTER frames), an error is propagated both spatially and temporally. In practice this means that, once an error occurs, it is easily visible to the human eye for a relatively long time. Especially susceptible are transmissions at low bit-rates where there are only a few INTRA-coded frames, so temporal error propagation is not stopped for some time. Secondly, the use of variable length codes increases the susceptibility to errors. When a bit error alters the codeword, the decoder will lose codeword synchronisation and also decode subsequent error-free codewords (comprising several bits) incorrectly until the next synchronisation (or start) code. A synchronisation code is a bit pattern which cannot be generated from any legal combination of other codewords and such codes are added to the bit stream at intervals to enable re-synchronisation. In addition, errors occur when data is lost during transmission. For example, in video applications using the unreliable UDP transport protocol in IP networks, network elements may discard parts of the encoded video bit-stream.

There are many ways for the receiver to address the corruption introduced in the transmission path. In general, on receipt of a signal, transmission errors are first detected and then corrected or concealed by the receiver. Error correction refers to the process of recovering the erroneous data perfectly as if no errors had been introduced in the first place. Error concealment refers to the process of concealing the effects of transmission errors so that they are hardly visible in the reconstructed video sequence. Typically some amount of redundancy is added by the source or transport coding in order to help error detection, correction and concealment. Error concealment techniques can be roughly classified into three categories: forward error concealment, error concealment by post-processing and interactive error concealment. The term "forward error concealment" refers to those techniques in which the transmitter side adds redundancy to the transmitted data to enhance the error resilience of the encoded data. Error concealment by post-processing refers to operations at the decoder in response to characteristics of the received signals. These methods estimate the correct representation of erroneously received data. In interactive error concealment, the transmitter and receiver co-operate in order to minimise the effect of transmission errors. These methods heavily utilise feedback information provided by the receiver. Error concealment by post-processing can also be referred to as passive error concealment whereas the other two categories represent forms of active error concealment.

There are numerous known concealment algorithms, a review of which is given by Y. Wang and Q.-F. Zhu in "Error Control and Concealment for Video Communication: A Review", Proceedings of the IEEE, Vol. 86, No. 5, May 1998, pp. 974-997 and an article by P. Salama, N. B. Shroff, and E.

J. Delp, "Error Concealment in Encoded Video," submitted to IEEE Journal on Selected Areas in Communications.

Current video coding standards define a syntax for a self-sufficient video bit-stream. The most popular standards at the time of writing are ITU-T Recommendation H.263, "Video coding for low bit rate communication", February 1998; ISO/IEC 14496-2, "Generic Coding of Audio-Visual Objects. Part 2: Visual", 1999 (known as MPEG-4); and ITU-T Recommendation H.262 (ISO/IEC 13818-2) (known as MPEG-2). These standards define a hierarchy for bit-streams and correspondingly for image sequences and images.

In H.263, the syntax has a hierarchical structure with four layers: picture, picture segment, macroblock, and block layer. The picture layer data contain parameters affecting the whole picture area and the decoding of the picture data. Most of this data is arranged in a so-called picture header.

The picture segment layer can either be a group of blocks layer or a slice layer. By default, each picture is divided into groups of blocks. A group of blocks (GOB) typically comprises 16 successive pixel lines. Data for each GOB consists of an optional GOB header followed by data for macroblocks. If the optional slice structured mode is used, each picture is divided into slices instead of GOBs. A slice contains a number of successive macroblocks in scan-order. Data for each slice consists of a slice header followed by data for the macroblocks.

Each GOB or slice is divided into macroblocks. A macroblock relates to 16×16 pixels (or 2×2 blocks) of luminance and the spatially corresponding 8×8 pixels (or block) of chrominance components. A block relates to 8×8 pixels of luminance or chrominance.

Block layer data consist of uniformly quantised discrete cosine transform coefficients, which are scanned in zigzag order, processed with a run-length encoder and coded with variable length codes. MPEG-2 and MPEG-4 layer hierarchies resemble the one in H.263.

By default these standards generally use the temporally previous reference picture (I or P) (also known as an anchor picture) as a reference for motion compensation. This piece of information is not transmitted, i.e., the bit-stream does not include information identifying the reference picture. Consequently, decoders have no means to detect if a reference picture is lost. Although many transport coders place video data into packets and associate a sequence number with the packets, these sequence numbers are not related to the video bit-stream. For example, a section of video bit-stream may contain P-picture P1, B-picture B2, P-picture P3, and P-picture P4, captured (and to be displayed) in this order. However, this section would be compressed, transmitted, and decoded in the following order: P1, P3, B2, P4 since B2 requires both P1 and P3 before it can be encoded or decoded. Assuming that there is one picture per packet, that each packet contains a sequence number and that the packet carrying B2 is lost, the receiver can detect this packet loss from the packet sequence numbers. However, the receiver has no means to detect if it has lost a motion compensation reference picture for P4 or if it has lost a B-picture, in which case it could continue decoding normally.

The decoder therefore usually sends an INTRA request to the transmitter and freezes the picture on the display. However the transmitter may not be about to respond to this request. For instance in a non-real-time video streaming application, the transmitter cannot respond to an INTRA request from a decoder. Therefore the decoder freezes the picture until the next INTRA frame is received. In a real-time application such as video-conferencing, the transmitter may not be able to respond. For instance, in a multi-party conference, the encoder may not be able to respond to individual requests. Again the decoder freezes the picture until an INTRA frame is output by the transmitter.

SUMMARY OF THE INVENTION

According to a first aspect of the invention there is provided a method of encoding a video signal representing a sequence of pictures, the method employing both non-temporal prediction and temporal prediction, wherein the method comprises, for each picture that forms a reference picture for the temporal prediction of another picture, associating with each such picture an indicator indicating the temporal order of the reference picture in the encoded video signal relative to the other reference pictures in the encoded video signal.

Thus each reference picture (e.g. I-frames and P-frames) is associated with a sequence number. Preferably the indicator is incremented each time a reference picture is encoded. Most advantageously the indicator is incremented by one each time a reference picture is encoded. Thus the indicator is incremented by one from the previous reference picture.

If multi-layer coding is used, preferably this indicator is incremented by one from the previous reference picture in the same enhancement layer.

Including this indicator means that a decoder is capable of determining whether a reference picture has been lost and to take appropriate action, if available. This is the case even if the transport protocol does not include sequence information about the packets being transmitted or the transmitter uses a varying encapsulation strategy. For example, if the transmitter encapsulates a varying number of GOBs in one packet, receivers cannot reliably know how many GOBs or entire pictures were lost even if they could detect packet losses from packet sequence numbers.

The invention also enables a decoder to differentiate B picture losses from reference picture losses. Consequently, decoders can continue decoding after a B picture loss instead of waiting for the next INTRA picture.

In addition a decoder may continue decoding lower enhancement layers if a reference picture from a higher enhancement layer is lost.

The reference picture order number may be in respect of the whole picture or part of a picture. In the former case, typically the reference picture order number is included in a picture header. In a preferred implementation of the invention, the video signal is encoded according to the H.263 standard and the indicator is included in the Supplemental Enhancement Information. Where the RPON is in respect of part of a picture the reference picture order number may be included in the picture segment headers or macroblock headers of the encoded picture.

In accordance with a second aspect of the invention there is provided a method of decoding an encoded video signal representing a sequence of pictures, the method comprising receiving an encoded video signal, decoding each received picture, examining for each picture to be decoded that forms a reference picture for another picture an indicator representing the temporal order of a reference frame and, when the indicator does not follow consecutively from an immediately preceding decoded reference frame, detecting a lost reference frame.

Preferably the decoder sends a request to a transmitter to encode a picture in a non-temporal manner when the indicator does not follow consecutively from an immediately preceding decoded reference frame.

In accordance with a third aspect of the invention there is provided an encoded video signal wherein for each picture that forms a reference picture for the temporal prediction of another picture, an indicator is associated with each such reference picture indicating the temporal order of the reference pictures in the encoded video stream.

In accordance with a fourth aspect of the invention there is provided a video encoder comprising an input for receiving a video signal representing a sequence of pictures and for generating encoded pictures, said encoder being arranged to employ both non-temporal prediction and temporal prediction, wherein the encoder is arranged, for each picture that forms a reference picture for the temporal prediction of another picture, to associate with each reference picture an indicator indicating the temporal order of the reference picture in the encoded video signal relative to other reference pictures in the encoded video signal.

Preferably the indicator is incremented each time a reference picture is encoded.

In accordance with a fifth aspect of the invention there is provided a video decoder comprising an input for receiving an encoded video signal representing a sequence of pictures, a decoder for decoding each received picture, the decoder being arranged to examine for each picture to be decoded that forms a reference picture for another picture an indicator representing the temporal order of a reference frame and, when the indicator does not follow consecutively from an immediately preceding decoded reference frame, to detect a lost reference frame.

The invention also relates to a portable radio communications device including an encoder and/or a decoder as described.

BRIEF DESCRIPTION OF THE DRAWINGS

The invention will now be described, by way of example only, with reference to the accompanying drawings, in which:

FIG. 1 shows a multimedia mobile communications system;

FIG. 2 shows an example of the multimedia components of a multimedia terminal;

FIG. 4 illustrates the operation of a first implementation of a video encoder according to a first embodiment of the invention;

FIG. 5 illustrates the operation of a second implementation of a video encoder according to a first embodiment of the invention;

FIG. 6 shows the syntax of a bit stream as known according to H.263;

FIG. 7 shows a first example of a bit stream output by an encoder according to the invention;

FIG. 8 shows a second example of a bit stream output by an encoder according to the invention;

FIG. 9 shows a third example of a bit stream output by an encoder according to the invention;

DETAILED DESCRIPTION OF THE INVENTION

Figure 3:
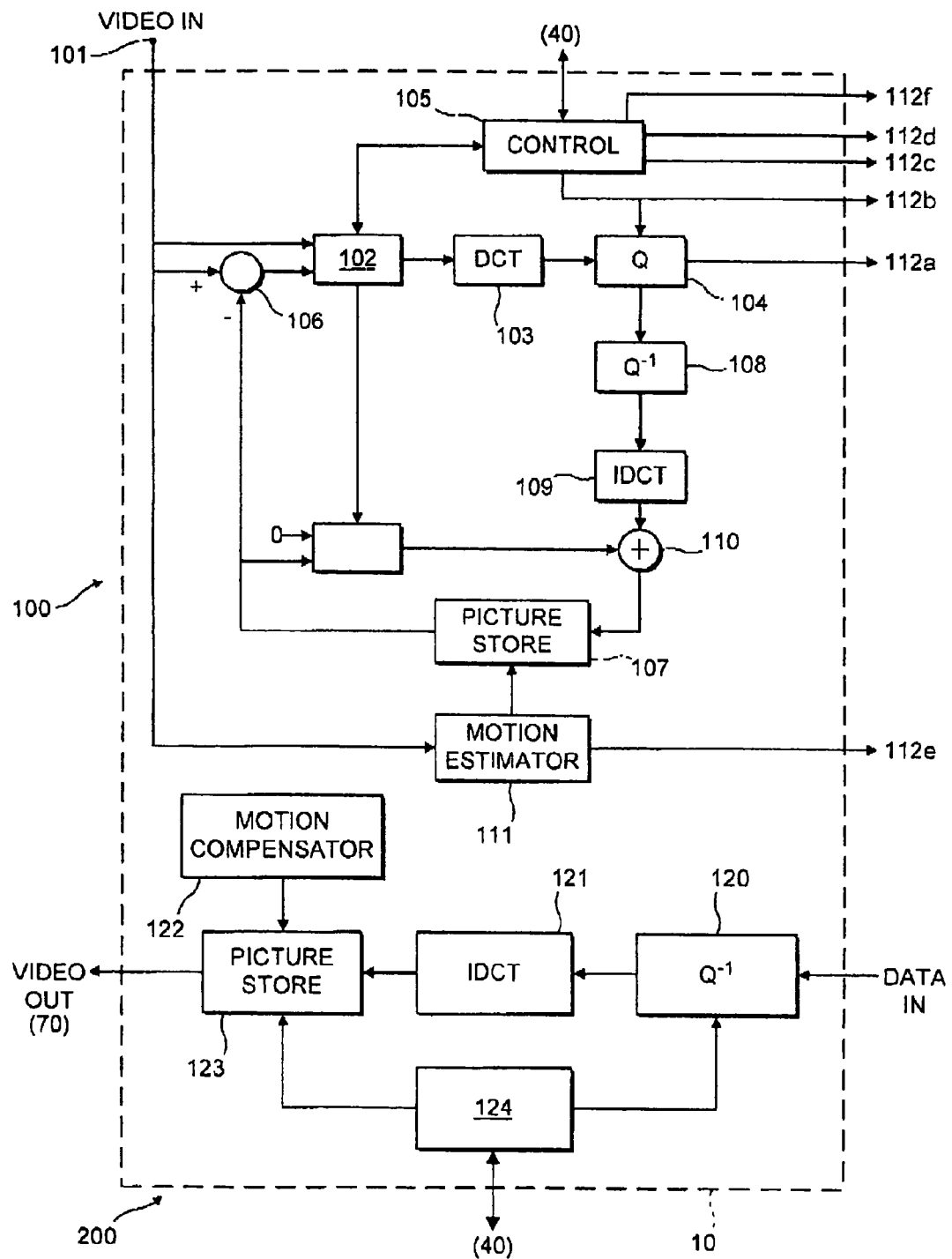
FIG. 3 shows an example of a video codec.

FIG. 1 shows a typical multimedia mobile communications system. A first multimedia mobile terminal 1 communicates with a second multimedia mobile terminal 2 via a radio link 3 to a mobile communications network 4. Control data is sent between the two terminals 1,2 as well as the multimedia data.

FIG. 2 shows the typical multimedia components of a terminal 1. The terminal comprises a video codec 10, an audio codec 20, a data protocol manager 30, a control manager 40, a multiplexer/demultiplexer 50 and a modem 60 (if the required). The video codec 10 receives signals for coding from a video capture device of the terminal (not shown) (e.g. a camera) and receives signals for decoding from a remote terminal 2 for display by the terminal 1 on a display 70. The audio codec 20 receives signals for coding from the microphone (not shown) of the terminal 1 and receive signals for decoding from a remote terminal 2 for reproduction by a speaker (not shown) of the terminal 1.

The control manager 40 controls the operation of the video codec 10, the audio codec 20 and the data protocol manager 30. However, since the invention is concerned with the operation of the video codec 10, no further discussion of the audio codec 20 and protocol manager 30 will be provided.

FIG. 3 shows an example of a video codec 10 according to the invention. The video codec comprises an encoder part 100 and a decoder part 200. The encoder part 100 comprises an input 101 for receiving a video signal from a camera or video source (not shown) of the terminal 1. A switch 102 switches the encoder between an INTRA-mode of coding and an INTER-mode.

In INTRA-mode, the video signal from the input 101 is transformed into DCT co-efficients by a DCT transformer 103. The DCT coefficients are then passed to a quantiser 104 that quantises the coefficients. Both the switch 102 and the quantiser 104 are controlled by an encoding control manager 105 of the video codec, which also receives feedback control from the receiving terminal 2 by means of the control manager 40.

In INTER mode, the switch 102 is operated to accept from a subtractor 106 the difference between the signal from the input 101 and a previous picture which is stored in a picture store 107. The difference data output from the subtractor 106 represents the prediction error between the current picture and the previous picture stored in the picture store 107. The data in the picture store 107 is generated by passing the data output by the quantiser through an inverse quantiser 108 and applying an inverse DCT transform 109 to the inverse-quantised data. The resulting data is added to the contents of the picture store 107 by adder 110. A motion estimator 111 may generate motion compensation data from the data in the picture store 107 in a conventional manner.

The encoding control manager 105 decides whether to apply INTRA or INTER coding or whether to code the frame at all on the basis of either the output of the subtractor 106 or in response to feedback control data received a receiving decoder. When not responding to feedback control data, the encoder typically encodes a frame as an INTRA-frame either only at the start of coding (all other frames being P-frames), or at regular periods e.g. every 5 s, or when the output of the subtractor exceeds a threshold i.e. when the current picture and that stored in the picture store 107 are too dissimilar. The encoder may also be programmed to encode frames in a particular regular sequence e.g. I B B P B B P B B P B B P B B P B I B B P etc. In addition the encoding control manager may decide not to code a received frame at all. This happens when the similarity between the current frame and the reference frame is so high that the encoder decides not to encode the current frame. The encoding control manager operates the switch accordingly.

The video codec outputs the quantised DCT coefficients 112a, the quantising index 112b (i.e. the details of the quantiser used), an INTRA/INTER flag 112c to indicate the mode of coding performed (I or P/B), a transmit flag 112d to indicate the number of the frame being coded and the motion vectors 112e for the picture being coded. These are multiplexed together by the multiplexer 50 together with other multimedia signals.

The decoder part 200 of the video codec 10 comprises an inverse quantiser 120, an inverse DCT transformer 121, a motion compensator 122, a picture store 123 and a controller 124. The controller 124 receives video codec control signals demultiplexed from the encoded multimedia stream by the demultiplexer 50. In practice the controller 105 of the encoder and the controller 124 of the decoder may be the same processor.

The operation of an encoder according to the invention will now be described. The video codec 10 receives a video signal to be encoded. The encoder 100 of the video codec encodes the video signal by performing DCT transformation, quantisation and motion compensation. The decoded video data is then output to the multiplexer 50. The multiplexer 50 multiplexes the video data from the video codec 10 and control data from the control manager 40 (as well as other signals as appropriate) into a multimedia signal. The terminal 1 outputs this multimedia signal to the receiving terminal 2 via the modem 60 (if required).

In a first embodiment of the invention, each time the encoder encodes a frame which may form the reference frame for a subsequent frame, the encoding control manager 105 associates with the frame a so-called Reference Picture Order Number (RPON). For example, a RPON is associated with every I or P frame of a video signal but not with a B-frame. The RPON value is incremented each time a successive reference picture is encoded, preferably by 1.

The encoding control manager 105 outputs the RPON codeword on output 112f which indicates the Reference Picture Order Number associated with the encoded frame. This is multiplexed into the video bitstream by a multiplexer.

Figures 4, 5:
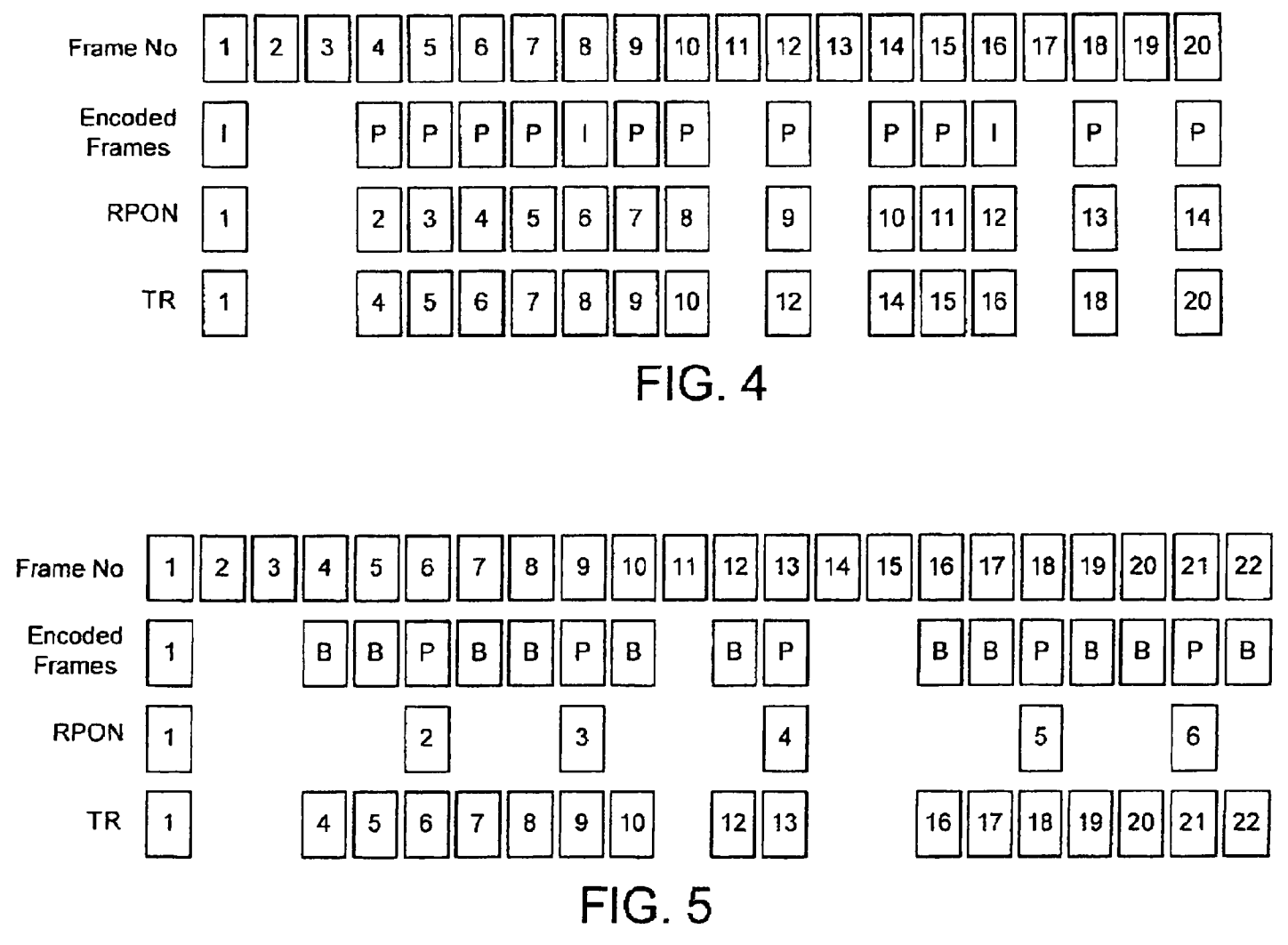

FIG. 4 illustrates the operation of the encoder. In this embodiment, the encoder is arranged to output an I-frame when the similarity between the frame being coded and the reference frame is less than a first threshold i.e. when the output from the subtractor 106 is greater than a first threshold. Otherwise the encoder outputs P-frames. The first line of FIG. 4 represents the frames of data received from a capture input device and input to the video encoder on input 101. The second line of FIG. 4 represents those frames of the input signal that the encoder decides to encode and the coding mode used to encode each frame. As mentioned above some, the encoding control manager may decide that a frame is not to be coded: this is exemplified in FIG. 4 by the fact that frames 2, 3 and 11 are not coded.

Frame 1 is coded in INTRA-mode; frame 4 is encoded as a P-frame with reference to frame 1; frame 5 is encoded as a P-frame with reference to frame 4; frame 6 is encoded as a P-frame with reference to frame 5; frame 7 is encoded as a P-frame with reference to frame 6; frame 8 is encoded as an I-frame; frame 9 is encoded as a P-frame with reference to frame 8; frame 10 is encoded as a P-frame with reference to frame 9; frame 12 is encoded as a P-frame with reference to frame 10.

In this embodiment all (but the last) of the encoded frames act as the reference frame for a later frame. Thus a RPON is associated with all of the frames to be coded, as shown in the third line of FIG. 4. As can be seen, the RPON is incremented by 1 each time.

The fourth line of FIG. 4 shows the Temporal Reference (TR) of the encoded frame. This is a field included in H.263 and the value of TR is formed by incrementing its value in the temporally previous reference picture header by one plus the number of skipped or non-reference pictures since the previously transmitted one. Thus in the example shown in FIG. 4 the TR shown for each frame is the same as the original number in the original signal input to 102.

FIG. 5 shows a second embodiment of an encoder according to the invention. In this embodiment, the encoder is arranged to code the frames according to the regular sequence I B B P B B P B B P B B P B B I B B P. The first line of FIG. 5 shows the input frames and the second line shows the coded frames and their coding mode, I, P or B.

The frames are received from a video capture device in the order 1, 2, 3, 4, 5, 6 etc. and are displayed in this order i.e. the decoded frames are displayed in the order I1, B2, B3, P4, B5, B6, P7 etc. However the video bit stream is compressed, transmitted and decoded in the following order I1, P4, B2, B3, P7, B5, B6 etc. This is because each B-frame requires preceding and succeeding reference frames before they can be encoded/decoded i.e. frame B2 requires frame I1 and P4 to be encoded/decoded before frame B2 can be encoded/decoded.

As explained previously, B-frames are inserted between anchor picture pairs of I- and/or P-frames and are predicted from either one or both of these anchor pictures. Thus in the illustration given in FIG. 5, Frame 1 is coded in INTRA-mode; frame 4 is encoded as a B-frame with reference to frame 1 and/or 6; frame 5 is encoded as a B-frame with reference to frame 1 and/or 6; frame 6 is encoded as a P-frame with reference to frame 1; frame 7 is encoded as a B-frame with reference to frame 6 and/or 9; frame 8 is encoded as an B-frame with reference to frame 6 and/or 9; frame 9 is encoded as a P-frame with reference to frame 6; frame 10 is encoded as a B-frame with reference to frame 9 and/or 13 (not shown); frame 12 is encoded as a B-frame with reference to frame 9 and/or 13 and so on.

In this embodiment each I-frame and P-frame of the encoded sequence acts as a reference frame for another frame. However a B-frame does not act as a reference picture for any other frame. Thus a RPON is associated with all of the I-frames and P-frames, as shown in the third line of FIG. 5. As can be seen, the RPON is incremented by 1 each time. Thus frame 1 (an I-frame) has a RPON of 1, frame 4 (a P-frame) has a RPON of 2 and frame 9 (a P-frame) has a RPON of 3.

The fourth line of FIG. 5 shows the Temporal Reference (TR) of the encoded frame. As in the example shown in FIG. 4, the TR shown for each frame is the same as the order of occurrence in the original signal input to 10.

Considering the terminal 1 as receiving coded video data from terminal 2, the operation of the video codec 10 will now be described with reference to its decoding role. The terminal 1 receives a multimedia signal from the transmitting terminal 2. The demultiplexer 50 demultiplexes the multimedia signal and passes the video data to the video codec 10 and the control data to the control manager 40. The decoder 200 of the video codec decodes the encoded video data by inverse quantising, inverse DCT transforming and motion compensating the data. The controller 124 of the decoder checks the integrity of the received data and, if an error is detected, attempts to conceal the error in a manner to be described below. The decoded, corrected and concealed video data is then output for reproduction on a display 70 of the receiving terminal 1.

Errors in video data may occur at the picture level, the GOB level or the macroblock level. Error checking may be carried out at any or all of these levels.

Considering first the signal as shown in FIG. 4, when a decoder according to the invention receives this signal each frame of the signal is decoded in a conventional manner and then displayed on a display means. The decoded frame may be error corrected and error concealed in a conventional manner. Each time a frame is decoded, the decoder examines the TR field to determine when the frame is to be displayed. If the TRs are not consecutive (e.g. the decoder receives a frame with TR=1 and then a frame with TR=4) the decoder holds the frame 1 on the display for 3 times the usual frame period, as is conventional. The decoder also examines the RPON of the received frames. In the case shown in FIG. 4 the decoder receives frame 1 and sees that this frame has a RPON=1; the decoder then receives a frame with TR=4 and RPON=2. The decoder compares the RPON of the currently received frame with the RPON of the previously received frame and calculates the difference between the RPON values. In this case the difference is 1 and the decoder therefore knows that no reference pictures have been lost between the current frame and the previous decoded reference frame. The decoder therefore continues to decode the signal in a conventional manner.

Let us now assume that the decoder is unable to reconstruct frame 5 (this could be due to the data being greatly corrupted or being lost altogether) and the next frame received and decoded by the decoder is frame 6. The decoder compares the RPON of the currently received frame (frame 6) with the RPON of the previously received and decoded reference frame (frame 4) and calculates the difference between the RPON values. In this case the difference is 2 and the decoder therefore knows that a reference picture has been lost between transmission of the current frame and that of the previous frame. If the decoder has the facility to send control feedback data to the transmitting video encoder the decoder can send a request to the transmitting video encoder to encode a frame as an INTRA-frame and so stop the temporal error propagation that would result from frame 6 being decoded with reference to frame 4.

Considering now the signal as shown in FIG. 5, when a decoder according to the invention receives this signal each frame of the signal is decoded in a conventional manner and then displayed on a display means. The decoded frame may be error corrected and error concealed in a conventional manner. Each time a frame is decoded, the decoder examines the TR field to determine when the frame is to be displayed. The decoder also examines the RPON of the received frames.

In the case shown in FIG. 5 the decoder receives frame 1 and sees that this frame has a RPON=1. The decoder decodes this frame in a conventional INTRA-mode manner. The next frame received by the decoder is then frame 6, with TR=6 and RPON=2. The decoder compares the RPON of the currently received frame (frame 6) with the RPON of the previously received and decoded reference frame (frame 1) and calculates the difference between the RPON. In this case the difference is 1 and the decoder therefore knows that no reference pictures have been lost between transmission of the current frame and that of the previous decoded reference frame. The decoder then decodes frame 6 with reference to frame 1.

The decoder then receives a frame with TR=4 and no RPON. In this case the decoder makes no further use of the RPON and decodes frame 4 with reference to decoded frames 1 and 6.

Let us now assume that the decoder is unable to reconstruct frame 5 (this could be due to the data being greatly corrupted or being lost altogether). The fact that B-frame 5 has been lost is of no consequence to the decoder as the B-frame does not form a reference picture for any other frame and thus its loss will not introduce any temporal error propagation.

The next frame to be received is frame 9. However, let us now assume that the decoder is unable to reconstruct frame 9, which is a P-frame (this could be due to the data being greatly corrupted or being lost altogether). The decoder may therefore be unable to decode successfully any of frames 7, 8, 10 or 12 since these may all be predicted, in part at least, with reference to frame 9. Typically, in this situation, the decoder will freeze the displayed picture.

The next frame received and decoded by the decoder is frame 13. The decoder compares the RPON of the currently received reference frame (frame 13) with the RPON of the previously received and decoded reference frame (frame 6) and calculates the difference between the RPON. In this case the difference is 2 and the decoder therefore knows that a reference picture has been lost between the current frame and the previous decoded reference frame. If the decoder has the facility to send control feedback data to the transmitting video encoder the decoder can send a request to the transmitting video encoder to encode a frame as an INTRA-frame and so stop the temporal error propagation that would result from frame 13 being decoded with reference to frame 6.

How the reference picture order number may be included in the encoded signal will now be addressed with reference to the H.263 video coding standard.

FIG. 6 shows the syntax of a bit stream as known according to H.263. The following implementations describe the GOB format but it will be clear to a skilled person that the invention may also be implemented in the slice format.

As mentioned already, the bit stream has four layers: the picture layer, picture segment layer, macroblock layer and block layer. The picture layer comprises a picture header followed by data for the Group of Blocks, eventually followed by any optional end-of-sequence code and stuffing bits.

The prior art H.263 bit stream is formatted as shown in FIG. 6. A descriptor for each part is given below:

PSC The picture start code (PSC) indicates the start of the picture

TR The Temporal Reference (TR) is formed by incrementing its value in the temporally previous reference picture header by one plus the number of skipped or non-referenced pictures since the previously transmitted one PTYPE Amongst other things, PTYPE includes details of the picture coding type i.e. INTRA or INTER PQUANT A codeword that indicates the quantiser to be used for the picture until updated by any subsequent quantiser information CPM A codeword that signals the use of optional continuous presence multipoint and video multiplex (CPM) mode PSBI Picture Sub-Bit stream Indicator—only present if CPM is set $TR_B$ Present if the frame is a bi-directionally predicted frame (known as a PB-frame)

DBQUANT Present if a bidirectional frame

PEI This relates to extra insertion information and is set to "1" to indicate the presence of the following optional data fields PSUPP and PEI. PSUPP and PEI are together known as Supplemental Enhancement Information, which is further defined in Annex L of H263.

GOBS Is the data for the group of blocks for the current picture

ESTF A stuffing codeword provided to attain byte alignment before EOS

EOS A codeword indicating the end of the data sequence for the picture

PSTUF A stuffing codeword to allow for byte alignment of the next picture start code PSC The structure as shown in FIG. 4 does not include the optional PLUSTYPE data field. PSBI is only present if indicated by CPM. TRB and DBQUANT are only present if PTYPE indicates use of a so-called PB frame mode (unless the PLUSTYPE filed is present and the used of DBQUANT is indicated therein). These issues are addressed in more detail in the H.263 specification.

The following paragraphs outline possible implementations of the bit-stream output by an encoder according to the first aspect of the invention.

The reference picture order number may be incorporated into a H.263 bit stream as follows. FIG. 7 shows an example of a bit stream output by an encoder according to the first implementation of the invention. As shown in FIG. 7, the bit stream includes a further codeword RPON which is a codeword indicating the reference picture order number. This is inserted by an encoder according to the invention, as described above.

Alternatively, the reference picture order number may be included in the Supplemental Enhancement Information PSUPP (see Annex L of H.263 and FIG. 4). The supplemental information may be present in the bit stream even though the decoder may not be capable of providing the enhanced capability to use it, or even to properly interpret it. Simply discarding the supplemental information is allowable by decoders unless a requirement to provide the requested capability has been negotiated by the transmitter and receiver.

If PEI is set to "1", then 9 bits follow consisting of 8 bits of data (PSUPP) and then another PEI bit to indicate if a further 9 bits follow and so on.

The PSUPP data consists of a 4-bit function type indication FTYPE, followed by a 4-bit parameter data size specification DSIZE followed by DSIZE octets of function parameter data, optionally followed by another FTYPE and so on. It is known to use this PSUPP codeword to signal various situations such as: to indicate a full-picture or partial-picture freeze or freeze-release request with or without resizing; to tag particular pictures or sequences of pictures within the video stream for external use; or to convey chroma key information for video compositing.

To implement the invention using the Supplemental Enhancement Information, a further FTYPE is defined as Reference Picture Order Number.

FIG. 8 illustrates the example where a parameter RPON is included in the SEI of the picture header. The FTYPE is defined as RPON. The DSIZE specifies the size of the parameter and the following octet is the parameter data i.e. the value of RPON. From this value a receiving decoder can determine whether a reference picture has been lost.

Alternatively, the information may be contained in the additional Supplemental Enhancement Information as specified in a "Draft of new Annex W: Additional Supplementary Enhancement Information Specification" P. Ning and S. Wenger, ITU-T Study Group 16 Question 15 Document Q15-I-58, November 1999.

In this draft proposal, FTYPE 14 is defined as "Picture Message". When this FTYPE is set, the picture message function indicates the presence of one or more octets representing message data. The first octet of the message data is a message header with the structure shown in FIG. 9 i.e. CONT, EBIT and MTYPE. DSIZE is equal to the number of octets in the message data corresponding to a picture message function, including the first octet message header.

The continuation field CONT, if equal to 1, indicates that the message data associated with the picture message is part of the same logical message as the message data associated with the next picture message function. The End Bit Position field EBIT specifies the number of least significant bits that shall be ignored in the last message octet. Further details of these fields can be found in the draft of Annex W referred to above.

The field MTYPE indicates the type of message. Various types of message are suggested in the draft of Annex W. According to the invention one type e.g. MTYPE 12 is defined as RPON or Picture Number. The message contains two data bytes that carry a 10-bit Picture Number. Consequently, DSIZE shall be 3, CONT shall be 0, and EBIT shall be 6. Picture Number shall be incremented by 1 for each coded and transmitted I or P picture or PB or Improved PB frame, in a 10-bit modulo operation. For EI and EP pictures, Picture Number shall be incremented for each EI or EP picture within the same scalability enhancement layer. For B pictures, Picture Number shall be incremented relative to the value in the most recent non-B picture in the reference layer of the B picture which precedes the B picture in bitstream order (a picture which is temporally subsequent to the B picture). If adjacent pictures in the same enhancement layer have the same temporal reference, and if the reference picture selection mode (see Annex N) is in use, the decoder shall regard this occurrence as an indication that redundant copies have been sent of approximately the same pictured scene content, and all of these pictures shall share the same Picture Number. If the difference (modulo 1024) of the Picture Numbers of two consecutively received non-B pictures in the same enhancement layer is not 1, and if the pictures do not represent approximately the same pictured scene content as described above, a loss of pictures or corruption of data may be inferred by the decoder. The value of RPON is defined in the octet following the message header.

In a specific example, this message contains one data byte, i.e., DSIZE is 2, CONT is 0, and EBIT is 0.

The Reference Picture Order Number is incremented by one from the corresponding number of the previous coded reference picture. The least significant 8-bits of the result of the incrementation is placed in the data byte associated with this message.

The invention may also be implemented in accordance with Annex U of H.263.

The above description has made reference to encoded video streams in which bi-directionally predicted pictures (B-pictures) are encoded. As mentioned earlier, B-pictures are never used as reference pictures. Since they can be discarded without impacting the picture quality of future pictures, they provide temporal scalability. Scalability allows for the decoding of a compressed video sequence at more than one quality level. In other words, a scalable multimedia clip can be compressed so that it can be streamed over channels with different data rates and still be decoded and played back in real-time.

Thus the video stream may be decoded in different ways by differing decoders. For instance, a decoder can decide only to decode the I- and P-pictures of a signal, if this is the maximum rate of decoding that the decoder can attain. However if a decoder has the capacity, it can also decode the B-pictures and hence increase the picture display rate. Thus the perceived picture quality of the displayed picture will be enhanced over a decoder that only decodes the I- and P-pictures.

Scalable multimedia is typically ordered so that there are hierarchical layers of data. A base layer contains a basic representation of the multimedia clip whereas enhancement layers contain refinement data on top of underlying layers. Consequently, the enhancement layers improve the quality of the clip.

Scalability is a desirable property for heterogeneous and error prone environments. This property is desirable in order to counter limitations such as constraints on bit rate, display resolution, network throughput, and decoder complexity.

Scalability can be used to improve error resilience in a transport system where layered coding is combined with transport prioritisation. The term transport prioritisation here refers to various mechanisms to provide different qualities of service in transport, including unequal error protection, to provide different channels having different error/loss rates. Depending on their nature, data are assigned differently. For example, the base layer may be delivered through a channel with a high degree of error protection, and the enhancement layers may be transmitted through more error-prone channels.

Generally, scalable multimedia coding suffers from a worse compression efficiency than non-scalable coding. In other words, a multimedia clip encoded as a scalable multimedia clip with enhancement layers requires greater bandwidth than if it had been coded as a non-scalable single-layer clip with equal quality. However, exceptions to this general rule exist, for example the temporally scalable B-frames in video compression.

Figure 10:
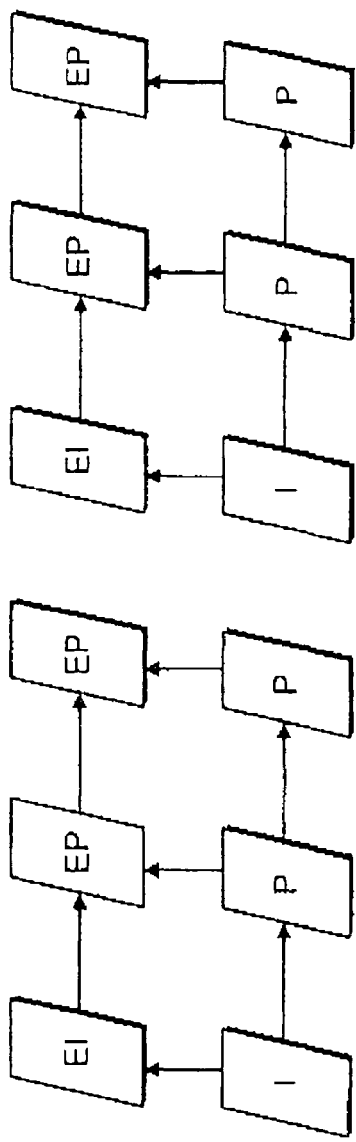
FIG. 10 illustrates enhancement layers used in video coding for SNR scalablity.

The invention may be applied to other scalable video compression systems. For instance, in H.263 Annex O, two other forms of scalability are defined: signal-to-noise (SNR) scalability and spatial scalability. Spatial scalability and SNR scalability are closely related, the only difference being the increased spatial resolution provided by spatial scalability. An example of SNR scalable pictures is shown in FIG. 10. SNR scalability implies the creation of multi-rate bit streams. It allows for the recovery of coding errors, or differences between an original picture and its reconstruction. This is achieved by using a finer quantiser to encode the difference picture in an enhancement layer. This additional information increases the SNR of the overall reproduced picture.

Figure 11:
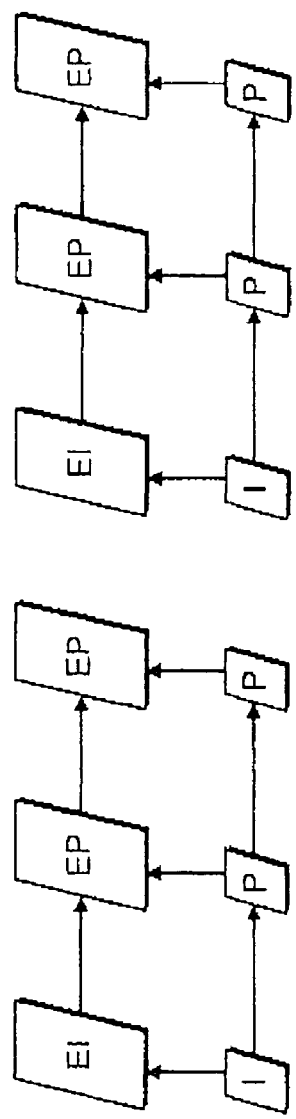
FIG. 11 illustrates enhancement layers used in video coding for spatial scalablity.

Spatial scalability allows for the creation of multi-resolution bit streams to meet varying display requirements and/or constraints. A spatially scalable structure is illustrated in FIG. 11. It is essentially the same as in SNR scalability except that a spatial enhancement layer attempts to recover the coding loss between an up-sampled version of the reconstructed reference layer picture and a higher resolution version of the original picture. For example, if the reference layer has a quarter common intermediate format (QCIF) resolution, and the enhancement layer has a common intermediate format (CIF) resolution, the reference layer picture must be scaled accordingly such that the enhancement layer picture can be predicted from it. The QCIF standard allows the resolution to be increased by a factor of two in the vertical direction only, horizontal direction only, or both the vertical and horizontal directions for a single enhancement layer. There can be multiple enhancement layers, each increasing the picture resolution over that of the previous layer. The interpolation filters used to up-sample the reference layer picture are explicitly defined in the H.263 standard. Aside from the up-sampling process from the reference to the enhancement layer, the processing and syntax of a spatially scaled picture are identical to those of an SNR scaled picture.

In either SNR or spatial scalability, the enhancement layer pictures are referred to as EI- or EP-pictures. If the enhancement layer picture is upwardly predicted from a picture in the reference layer, then the enhancement layer picture is referred to as an Enhancement-I (EI) picture. In this type of scalability, the reference layer means the layer "below" the current enhancement layer. In some cases, when reference layer pictures are poorly predicted, over-coding of static parts of the picture can occur in the enhancement layer, causing an unnecessarily excessive bit rate. To avoid this problem, forward prediction is permitted in the enhancement layer. A picture that can be predicted in the forward direction from a previous enhancement layer picture or, alternatively, upwardly predicted from the reference layer picture is referred to as an Enhancement-P (EP) picture. Note that computing the average of the upwardly and forwardly predicted pictures can provide bi-directional prediction for EP-pictures. For both EI- and EP-pictures, upward prediction from the reference layer picture implies that no motion vectors are required. In the case of forward prediction for EP-pictures, motion vectors are required.

According to the invention, if the encoder is capable of multi-layer coding (for example as discussed in Annex O of H.263) the reference pictures of each layer are given consecutive Reference Picture Order Numbers. These may be associated with the enhancement layer number (ELNUM) of the current picture. The Reference Picture Order Number is incremented by one from the corresponding number of the previous coded reference picture in the same enhancement layer.

As shown in FIGS. 10 and 11, the pictures of the enhancement layer may be predicted from a preceding picture of the enhancement layer and/or from the equivalent I- or P-picture of the base layer. The enhancement layer may not be predicted from a B-picture in the reference layer.

If adjacent pictures in the same enhancement layer have the same temporal reference, and if Annex N or Annex U of H.263 is in use, the decoder preferably regards this occurrence as an indication that redundant copies have been sent of approximately the same pictured scene content, and all of these pictures then share the same RPON.

A decoder according to the invention, on receipt of a multi-layer signal as described above, attempts to decode the signal in a conventional manner. In each layer, each time a reference picture is decoded, the decoder examines the RPON of the decoded picture. If the decoder determines that a reference picture has been lost from an enhancement layer, the decoder ceases to display pictures from the enhancement layer until an EI-picture is received. The decoder continues to decode the base layer as described earlier.

The invention is not intended to be limited to the video coding protocols discussed above: these are intended to be merely exemplary. The invention is applicable to any video coding protocol in which temporal prediction may be used. The addition of the information as discussed above allows a receiving decoder to determine that a reference picture has been lost and to take appropriate action.

What is claimed is:

1. A method of encoding a video signal using an encoder to form an encoded video signal, the video signal representing a sequence of pictures, the method comprising the encoder using an independent numbering scheme, to assign consecutive reference pictures in encoding order with respective sequence indicator values that differ with respect to each other by a predetermined amount independent of one or more of the number of non-reference pictures encoded between consecutive reference pictures and the number of non-coded pictures between consecutive reference pictures.

2. A method according to claim 1, comprising the encoder incrementing the sequence indicator value by one between consecutively encoded reference pictures.

3. A method according to claim 1, comprising the encoder providing the sequence indicator value for a particular picture in a corresponding picture header.

4. A method according to claim 1, comprising the encoder encoding the video signal according to the H.263 video coding standard and providing the sequence indicator value for a particular picture in the corresponding Supplemental Enhancement Information of the H.263 bit-stream.

5. A method according to claim 1, comprising the encoder associating a sequence indicator value with the whole of a picture.

6. A method according to claim 1, comprising the encoder associating a sequence indicator value with part of a picture.

7. A method according to claim 6, comprising the encoder providing the sequence indicator value in a picture segment header or a macroblock header of an encoded picture.

8. A method according to claim 1, comprising the encoder encoding the video signal using multi-layer coding to produce an encoded video signal with multiple layers and providing respective sequence indicator values for each of said multiple layers of the multi-layer coded video signal.

9. A method according to claim 1, comprising the encoder using a fixed value as the predetermined amount.

10. A method according to claim 1, comprising the encoder using sequence indicator values which are reference picture order numbers.

11. A method according to claim 1, comprising the encoder encoding reference pictures in I-picture format or P-picture format.

12. A method according to claim 1, comprising the encoder encoding non-reference pictures in B-picture format.

13. A method according to claim 1, comprising the encoder incrementing the sequence indicator value by said predetermined amount between consecutively encoded reference pictures when there are no non-reference pictures.

14. A non-transitory computer readable storage medium comprising a computer program embodied thereon, the computer program comprising computer program code for performing the encoding method of claim 1.

15. A method of decoding an encoded video signal using a decoder to form a decoded video signal, the video signal representing a sequence of pictures, the method comprising:
the decoder examining decoded reference pictures to identify a difference in respective sequence indicator values assigned to consecutively encoded reference pictures;
the decoder comparing the identified difference in said sequence indicator values on the basis of an independent numbering scheme in which consecutive reference pictures in encoding order are assigned sequence indicator values that differ with respect to each other by a predetermined amount, independent of one or more of the number of non-reference pictures encoded between consecutive reference pictures, and the number of non-coded pictures between consecutive reference pictures; and
the decoder detecting corruption or loss of a reference picture if said identified difference in sequence indicator values is more than said predetermined amount.

16. A method according to claim 15, comprising the decoder comparing the sequence indicator value assigned to a particular received and decoded reference picture with the sequence indicator value assigned to an immediately preceding received and decoded reference picture.

17. A method according to claim 15, further comprising the decoder sending a request for an encoder to provide a picture encoded in a non-temporally-predicted manner when said identified difference differs from said predetermined amount.

18. A method according to claim 15, comprising the decoder using a predetermined amount of one in said comparison when the sequence indicator values assigned to consecutive reference pictures in encoding order differ by one.

19. A method according to claim 15, comprising the decoder obtaining the sequence indicator value for a particular picture from a corresponding picture header.

20. A method according to claim 15, comprising the decoder receiving a video signal encoded according to the H.263 video coding standard and obtaining the sequence indicator value for a particular picture from the corresponding Supplemental Enhancement Information of the H.263 bitstream.

21. A method according to claim 15, wherein a sequence indicator value is associated with the whole of a picture.

22. A method according to claim 15, wherein a sequence indicator value is associated with part of a picture.

23. A method according to claim 22, comprising the decoder obtaining the sequence indicator value from a picture segment header or a macroblock header of an encoded picture.

24. A method according to claim 15, comprising the decoder examining identified differences in sequence indicator values provided for each layer of an encoded video signal that comprises multiple layers in order to detect corruption or loss of reference pictures within said layers.

25. A method according to claim 15, wherein the predetermined amount is a fixed value.

26. A method according to claim 15, wherein the sequence indicator value is a reference picture order number.

27. A method according to claim 15, wherein reference pictures are encoded in I-picture format or P-picture format.

28. A method according to claim 15, wherein non-reference pictures are encoded in B-picture format.

29. A method according to claim 15, wherein the sequence indicator value is incremented by said predetermined amount between consecutively encoded reference pictures when there are no non-reference pictures.

30. A non-transitory computer readable storage medium comprising a computer program embodied thereon, the computer program comprising computer program code for performing the decoding method of claim 15.

31. An apparatus for encoding a video signal representing a sequence of pictures to form an encoded video signal, wherein the apparatus is configured to use an independent numbering scheme to assign consecutive reference pictures in encoding order with respective sequence indicator values that differ with respect to each other by a predetermined amount independent of one or more of the number of non-reference pictures encoded between consecutive reference pictures, and the number of non-coded pictures between consecutive reference pictures.

32. An apparatus according to claim 31, wherein the apparatus is configured to increment the sequence indicator value by one between consecutively encoded reference pictures.

33. An apparatus according to claim 31, wherein the apparatus is configured to provide the sequence indicator value for a particular picture in a corresponding picture header.

34. An apparatus according to claim 31, wherein the apparatus is configured to encode the video signal according to the H.263 video coding standard and to provide the sequence indicator value for a particular picture in the corresponding Supplemental Enhancement Information of the H.263 bitstream.

35. An apparatus according to claim 31, wherein the apparatus is configured to associate a sequence indicator value with the whole of a picture.

36. An apparatus according to claim 31, wherein the apparatus is configured to associate a sequence indicator value with part of a picture.

37. An apparatus according to claim 36, wherein the apparatus is configured to provide the sequence indicator value in a picture segment header or a macroblock header of an encoded picture.

38. An apparatus according to claim 31, wherein the apparatus is configured to encode the video signal using multi-layer coding to produce an encoded video signal with multiple layers and to provide respective sequence indicator values for each of said multiple layers of the multi-layer coded video signal.

39. A portable radio communications device comprising an apparatus for encoding a video signal according to claim 31.

40. A multimedia terminal device comprising an apparatus for encoding a video signal according to claim 31.

41. An apparatus according to claim 31, wherein the apparatus is configured to use a fixed value as the predetermined amount.

42. An apparatus according to claim 31, wherein the apparatus is configured to use sequence indicator values which are reference picture order numbers.

43. An apparatus according to claim 31, wherein the apparatus is configured to encode reference pictures in I-picture format or P-picture format.

44. An apparatus according to claim 31, wherein the apparatus is configured to encode non-reference pictures in B-picture format.

45. An apparatus according to claim 31, wherein the apparatus is configured to increment the sequence indicator value by said predetermined amount between consecutively encoded reference pictures when there are no non-reference pictures.

46. An apparatus for decoding an encoded video signal representing a sequence of pictures to form a decoded video signal, wherein the apparatus is configured to:
examine decoded reference pictures to identify a difference in respective sequence indicator values assigned to consecutively encoded reference pictures;
compare the identified difference in sequence indicator values on the basis of an independent numbering scheme in which consecutive reference pictures in encoding order are assigned sequence indicator values that differ with respect to each other by a predetermined amount, independent of one or more of the number of non-reference pictures encoded between consecutive reference pictures, and the number of non-coded pictures between consecutive reference pictures; and
detect corruption or loss of a reference picture if said identified difference in sequence indicator values is more than said predetermined amount.

47. An apparatus according to claim 46, wherein the apparatus is configured to compare the sequence indicator value assigned to a particular received and decoded reference picture with the sequence indicator value assigned to an immediately preceding received and decoded reference picture.

48. An apparatus according to claim 46, wherein the apparatus is further configured to send a request for an encoder to provide a picture encoded in a non-temporally-predicted manner when said identified difference differs from said predetermined amount.

49. An apparatus according to claim 46, wherein the apparatus is configured to use a predetermined amount of one in said comparison when the sequence indicator values assigned to consecutive reference pictures in encoding order differ by one.

50. An apparatus according to claim 46, wherein the apparatus is configured to obtain the sequence indicator value for a particular picture from a corresponding picture header.

51. An apparatus according to claim 46, wherein the apparatus is configured to receive a video signal encoded according to the H.263 video coding standard and to obtain a sequence indicator value for a particular picture from the corresponding Supplemental Enhancement Information of the H.263 bit-stream.

52. An apparatus according to claim 46, wherein a sequence indicator value is associated with the whole of a picture.

53. An apparatus according to claim 46, wherein a sequence indicator value is associated with part of a picture.

54. An apparatus according to claim 53, wherein the apparatus is configured to obtain the sequence indicator value from a picture segment header or a macroblock header of an encoded picture.

55. An apparatus according to claim 46, wherein the apparatus is configured to examine identified differences in sequence indicator values provided for each layer of an encoded video signal that comprises multiple layers in order to detect corruption or loss of reference pictures within said layers.

56. A portable radio communications device comprising an apparatus for decoding an encoded video signal according to claim 46.

57. A multimedia terminal device comprising an apparatus for decoding an encoded video signal according to claim 46.

58. An apparatus according to claim 46, wherein the predetermined amount is a fixed value.

59. An apparatus according to claim 46, wherein the sequence indicator value is a reference picture order number.

60. An apparatus according to claim 46, wherein the apparatus is configured to decode reference pictures encoded in I-picture format or P-picture format.

61. An apparatus according to claim 46, wherein the apparatus is configured to decode non-reference pictures encoded in B-picture format.

62. An apparatus according to claim 46, wherein the sequence indicator value is incremented by said predetermined amount between consecutively encoded reference pictures when there are no non-reference pictures.

\* \* \* \* \*